United States Patent
Hill et al.

(10) Patent No.: US 7,643,006 B2
(45) Date of Patent: *Jan. 5, 2010

(54) GESTURE RECOGNITION METHOD AND TOUCH SYSTEM INCORPORATING THE SAME

(75) Inventors: Douglas B. Hill, Calgary (CA); Gerald D. Morrison, Calgary (CA)

(73) Assignee: SMART Technologies ULC (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/189,579

(22) Filed: Aug. 11, 2008

(65) Prior Publication Data

US 2008/0297471 A1   Dec. 4, 2008

Related U.S. Application Data

(63) Continuation of application No. 10/662,813, filed on Sep. 16, 2003, now Pat. No. 7,411,575.

(51) Int. Cl.
*G09G 5/00* (2006.01)
(52) U.S. Cl. .................................... 345/156; 345/173
(58) Field of Classification Search ................ 345/156, 345/157, 163, 173, 177; 178/18.01–18.09, 178/19.01–19.05; 341/22, 33, 34; 715/812, 715/773, 863–866
See application file for complete search history.

(56) References Cited

U.S. PATENT DOCUMENTS

| | | | |
|---|---|---|---|
| 4,107,522 A | 8/1978 | Walter | |
| 4,144,449 A | 3/1979 | Funk et al. | |
| 4,247,767 A | 1/1981 | O'Brien et al. | |
| 4,507,557 A | 3/1985 | Tsikos | |
| 4,558,313 A | 12/1985 | Garwin et al. | |
| 4,737,631 A | 4/1988 | Sasaki et al. | |
| 4,742,221 A | 5/1988 | Sasaki et al. | |
| 4,746,770 A | 5/1988 | McAvinney | |
| 4,762,990 A | 8/1988 | Caswell et al. | |
| 4,782,328 A | 11/1988 | Denlinger | |
| 4,818,826 A | 4/1989 | Kimura | |
| 4,820,050 A | 4/1989 | Griffin | |
| 4,822,145 A * | 4/1989 | Staelin | 349/63 |
| 4,831,455 A | 5/1989 | Ishikawa | |

(Continued)

FOREIGN PATENT DOCUMENTS

CA   2493236 A1   12/2003

(Continued)

OTHER PUBLICATIONS

Notification of Transmittal of the International Search Report and the Written Opinion of the International Searching Authority regarding International Application No. PCT/CA2007/002184, as mailed on Mar. 13, 2008.

(Continued)

*Primary Examiner*—Ricardo L Osorio
(74) *Attorney, Agent, or Firm*—Katten Muchin Rosenman LLP

(57) ABSTRACT

A gesture recognition method includes detecting multiple pointers in close proximity to a touch surface to determine if the multiple pointers are being used to perform a known gesture. When the multiple pointers are being used to perform a known gesture, executing a command associated with the gesture. A touch system incorporating the gesture recognition method is also provided.

56 Claims, 4 Drawing Sheets

U.S. PATENT DOCUMENTS

| | | | |
|---|---|---|---|
| 4,868,912 A | 9/1989 | Doering | |
| 4,980,547 A | 12/1990 | Griffin | |
| 5,025,314 A | 6/1991 | Tang et al. | |
| 5,097,516 A | 3/1992 | Amir | |
| 5,109,435 A | 4/1992 | Lo et al. | |
| 5,130,794 A | 7/1992 | Ritcher | |
| 5,140,647 A | 8/1992 | Ise et al. | |
| 5,196,835 A | 3/1993 | Blue et al. | |
| 5,239,373 A | 8/1993 | Tang et al. | |
| 5,317,140 A | 5/1994 | Dunthorn | |
| 5,359,155 A * | 10/1994 | Helser | 178/18.11 |
| 5,374,971 A | 12/1994 | Clapp et al. | |
| 5,448,263 A * | 9/1995 | Martin | 345/173 |
| 5,483,261 A | 1/1996 | Yasutake | |
| 5,483,603 A | 1/1996 | Luke et al. | |
| 5,484,966 A * | 1/1996 | Segen | 178/18.09 |
| 5,490,655 A | 2/1996 | Bates | |
| 5,502,568 A | 3/1996 | Ogawa et al. | |
| 5,528,263 A * | 6/1996 | Platzker et al. | 345/156 |
| 5,528,290 A | 6/1996 | Saund | |
| 5,537,107 A | 7/1996 | Funado | |
| 5,554,828 A * | 9/1996 | Primm | 178/19.06 |
| 5,581,276 A | 12/1996 | Cipolla et al. | |
| 5,581,637 A | 12/1996 | Cass et al. | |
| 5,594,502 A | 1/1997 | Bito et al. | |
| 5,638,092 A | 6/1997 | Eng et al. | |
| 5,670,755 A | 9/1997 | Kwon | |
| 5,729,704 A * | 3/1998 | Stone et al. | 715/804 |
| 5,734,375 A | 3/1998 | Knox et al. | |
| 5,736,686 A * | 4/1998 | Perret et al. | 178/18.11 |
| 5,737,740 A | 4/1998 | Henderson et al. | |
| 5,745,116 A * | 4/1998 | Pisutha-Arnond | 715/863 |
| 5,764,223 A | 6/1998 | Chang et al. | |
| 5,771,039 A * | 6/1998 | Ditzik | 345/178 |
| 5,790,910 A | 8/1998 | Haskin | |
| 5,818,421 A | 10/1998 | Ogino et al. | |
| 5,818,424 A * | 10/1998 | Korth | 345/158 |
| 5,819,201 A * | 10/1998 | DeGraaf | 701/208 |
| 5,825,352 A * | 10/1998 | Bisset et al. | 345/173 |
| 5,831,602 A * | 11/1998 | Sato et al. | 345/175 |
| 5,911,004 A | 6/1999 | Ohuchi et al. | |
| 5,914,709 A * | 6/1999 | Graham et al. | 345/179 |
| 5,920,342 A | 7/1999 | Umeda et al. | |
| 5,936,615 A | 8/1999 | Waters | |
| 5,943,783 A * | 8/1999 | Jackson | 33/288 |
| 5,963,199 A | 10/1999 | Kato et al. | |
| 5,982,352 A | 11/1999 | Pryor | |
| 5,988,645 A * | 11/1999 | Downing | 273/348 |
| 6,002,808 A | 12/1999 | Freeman | |
| 6,008,798 A | 12/1999 | Mato, Jr. et al. | |
| 6,031,531 A | 2/2000 | Kimble | |
| 6,061,177 A | 5/2000 | Fujimoto | |
| 6,075,905 A | 6/2000 | Herman et al. | |
| 6,100,538 A | 8/2000 | Ogawa | |
| 6,104,387 A * | 8/2000 | Chery et al. | 345/179 |
| 6,118,433 A * | 9/2000 | Jenkin et al. | 345/173 |
| 6,122,865 A | 9/2000 | Branc et al. | |
| 6,141,000 A | 10/2000 | Martin | |
| 6,153,836 A * | 11/2000 | Goszyk | 178/19.01 |
| 6,161,066 A | 12/2000 | Wright et al. | |
| 6,179,426 B1 | 1/2001 | Rodriquez, Jr. et al. | |
| 6,191,773 B1 | 2/2001 | Maruno et al. | |
| 6,208,329 B1 | 3/2001 | Ballare | |
| 6,208,330 B1 | 3/2001 | Hasegawa et al. | |
| 6,209,266 B1 | 4/2001 | Branc et al. | |
| 6,226,035 B1 | 5/2001 | Korein et al. | |
| 6,252,989 B1 * | 6/2001 | Geisler et al. | 382/232 |
| 6,256,033 B1 | 7/2001 | Nguyen | |
| 6,262,718 B1 * | 7/2001 | Findlay et al. | 345/178 |
| 6,310,610 B1 * | 10/2001 | Beaton et al. | 345/173 |
| 6,323,846 B1 * | 11/2001 | Westerman et al. | 345/173 |
| 6,328,270 B1 | 12/2001 | Elberbaum | |
| 6,335,724 B1 | 1/2002 | Takekawa et al. | |
| 6,337,681 B1 | 1/2002 | Martin | |
| 6,339,748 B1 | 1/2002 | Hiramatsu | |
| 6,353,434 B1 | 3/2002 | Akebi | |
| 6,359,612 B1 * | 3/2002 | Peter et al. | 345/156 |
| 6,414,671 B1 | 7/2002 | Gillespie et al. | |
| 6,414,673 B1 | 7/2002 | Wood et al. | |
| 6,421,042 B1 | 7/2002 | Omura et al. | |
| 6,427,389 B1 | 8/2002 | Branc et al. | |
| 6,429,856 B1 | 8/2002 | Omura et al. | |
| 6,496,122 B2 | 12/2002 | Sampsell | |
| 6,497,608 B2 | 12/2002 | Ho et al. | |
| 6,507,339 B1 | 1/2003 | Tanaka | |
| 6,512,838 B1 | 1/2003 | Rafii et al. | |
| 6,517,266 B2 | 2/2003 | Saund | |
| 6,518,600 B1 | 2/2003 | Shaddock | |
| 6,522,830 B2 | 2/2003 | Yamagami | |
| 6,529,189 B1 | 3/2003 | Colgan et al. | |
| 6,530,664 B2 | 3/2003 | Vanderwerf et al. | |
| 6,531,999 B1 | 3/2003 | Trajkovic | |
| 6,545,669 B1 * | 4/2003 | Kinawi et al. | 345/173 |
| 6,559,813 B1 | 5/2003 | DeLuca et al. | |
| 6,563,491 B1 | 5/2003 | Omura | |
| 6,567,078 B2 | 5/2003 | Ogawa | |
| 6,567,121 B1 | 5/2003 | Kuno | |
| 6,570,612 B1 | 5/2003 | Saund et al. | |
| 6,587,099 B2 * | 7/2003 | Takekawa | 345/175 |
| 6,594,023 B1 | 7/2003 | Omura et al. | |
| 6,608,619 B2 | 8/2003 | Omura et al. | |
| 6,626,718 B2 | 9/2003 | Hiroki | |
| 6,630,922 B2 * | 10/2003 | Fishkin et al. | 345/156 |
| 6,633,328 B1 | 10/2003 | Byrd et al. | |
| 6,650,822 B1 | 11/2003 | Zhou | |
| 6,674,424 B1 | 1/2004 | Fujioka | |
| 6,683,584 B2 | 1/2004 | Ronzani et al. | |
| 6,690,363 B2 * | 2/2004 | Newton | 345/173 |
| 6,690,397 B1 * | 2/2004 | Daignault, Jr. | 715/764 |
| 6,710,770 B2 | 3/2004 | Tomasi et al. | |
| 6,741,250 B1 | 5/2004 | Furlan et al. | |
| 6,747,636 B2 | 6/2004 | Martin | |
| 6,756,910 B2 | 6/2004 | Ohba et al. | |
| 6,760,009 B2 * | 7/2004 | Omura et al. | 345/157 |
| 6,760,999 B2 | 7/2004 | Branc et al. | |
| 6,774,889 B1 | 8/2004 | Zhang et al. | |
| 6,803,906 B1 | 10/2004 | Morrison et al. | |
| 6,864,882 B2 * | 3/2005 | Newton | 345/173 |
| 6,919,880 B2 | 7/2005 | Morrison et al. | |
| 6,933,981 B1 | 8/2005 | Kishida et al. | |
| 6,972,401 B2 * | 12/2005 | Akitt et al. | 250/221 |
| 6,972,753 B1 * | 12/2005 | Kimura et al. | 345/175 |
| 7,007,236 B2 * | 2/2006 | Dempski et al. | 715/757 |
| 7,015,418 B2 | 3/2006 | Cahill et al. | |
| 7,030,861 B1 * | 4/2006 | Westerman et al. | 345/173 |
| 7,084,868 B2 | 8/2006 | Farag et al. | |
| 7,098,392 B2 | 8/2006 | Sitrick et al. | |
| 7,121,470 B2 | 10/2006 | McCall et al. | |
| 7,184,030 B2 | 2/2007 | McCharles et al. | |
| 7,187,489 B2 | 3/2007 | Miles | |
| 7,190,496 B2 | 3/2007 | Klug et al. | |
| 7,202,860 B2 * | 4/2007 | Ogawa | 345/175 |
| 7,232,986 B2 | 6/2007 | Worthington et al. | |
| 7,236,132 B1 | 6/2007 | Morrison et al. | |
| 7,274,356 B2 * | 9/2007 | Ung et al. | 345/158 |
| 7,355,593 B2 | 4/2008 | Hill et al. | |
| 7,414,617 B2 * | 8/2008 | Ogawa | 345/173 |
| 2001/0019325 A1 | 9/2001 | Takekawa | |
| 2001/0022579 A1 | 9/2001 | Hirabayashi | |
| 2001/0026268 A1 * | 10/2001 | Ito | 345/175 |
| 2001/0033274 A1 * | 10/2001 | Ong | 345/173 |
| 2002/0036617 A1 * | 3/2002 | Pryor | 345/156 |
| 2002/0050979 A1 * | 5/2002 | Oberoi et al. | 345/157 |
| 2002/0067922 A1 | 6/2002 | Harris | |

| | | | |
|---|---|---|---|
| 2002/0080123 A1 | 6/2002 | Kennedy et al. | |
| 2002/0145595 A1* | 10/2002 | Satoh | 345/173 |
| 2002/0163530 A1* | 11/2002 | Takakura et al. | 345/629 |
| 2003/0001825 A1* | 1/2003 | Omura et al. | 345/173 |
| 2003/0025951 A1* | 2/2003 | Pollard et al. | 358/505 |
| 2003/0043116 A1* | 3/2003 | Morrison et al. | 345/158 |
| 2003/0046401 A1 | 3/2003 | Abbott et al. | |
| 2003/0063073 A1* | 4/2003 | Geaghan et al. | 345/173 |
| 2003/0071858 A1* | 4/2003 | Morohoshi | 345/856 |
| 2003/0085871 A1* | 5/2003 | Ogawa | 345/158 |
| 2003/0095112 A1* | 5/2003 | Kawano et al. | 345/173 |
| 2003/0151532 A1* | 8/2003 | Chen et al. | 341/120 |
| 2003/0151562 A1 | 8/2003 | Kulas | |
| 2004/0021633 A1* | 2/2004 | Rajkowski | 345/156 |
| 2004/0031779 A1 | 2/2004 | Cahill et al. | |
| 2004/0046749 A1* | 3/2004 | Ikeda | 345/173 |
| 2004/0108990 A1 | 6/2004 | Lieberman | |
| 2004/0149892 A1* | 8/2004 | Akitt et al. | 250/221 |
| 2004/0150630 A1 | 8/2004 | Hinckley et al. | |
| 2004/0169639 A1 | 9/2004 | Pate et al. | |
| 2004/0178993 A1* | 9/2004 | Morrison et al. | 345/173 |
| 2004/0178997 A1* | 9/2004 | Gillespie et al. | 345/173 |
| 2004/0179001 A1* | 9/2004 | Morrison et al. | 345/179 |
| 2004/0189720 A1* | 9/2004 | Wilson et al. | 345/863 |
| 2004/0252091 A1 | 12/2004 | Ma et al. | |
| 2005/0052427 A1* | 3/2005 | Wu et al. | 345/173 |
| 2005/0057524 A1* | 3/2005 | Hill et al. | 345/173 |
| 2005/0083308 A1 | 4/2005 | Homer et al. | |
| 2005/0151733 A1* | 7/2005 | Sander et al. | 345/423 |
| 2005/0190162 A1* | 9/2005 | Newton | 345/173 |
| 2005/0248540 A1* | 11/2005 | Newton | 345/173 |
| 2005/0276448 A1* | 12/2005 | Pryor | 382/103 |
| 2006/0158437 A1 | 7/2006 | Blythe et al. | |
| 2006/0202953 A1* | 9/2006 | Pryor et al. | 345/156 |
| 2006/0227120 A1 | 10/2006 | Eikman | |
| 2006/0274067 A1* | 12/2006 | Hidai | 345/441 |
| 2007/0075648 A1 | 4/2007 | Blythe et al. | |
| 2007/0075982 A1* | 4/2007 | Morrison et al. | 345/173 |
| 2007/0126755 A1* | 6/2007 | Zhang et al. | 345/619 |
| 2007/0139932 A1 | 6/2007 | Sun et al. | |
| 2007/0236454 A1* | 10/2007 | Ung et al. | 345/158 |
| 2008/0129707 A1* | 6/2008 | Pryor | 345/175 |

FOREIGN PATENT DOCUMENTS

| | | |
|---|---|---|
| DE | 198 10 452 A1 | 12/1998 |
| EP | 0279652 A | 8/1988 |
| EP | 0347725 A2 | 12/1989 |
| EP | 0 657 841 A1 | 6/1995 |
| EP | 0762319 A2 | 3/1997 |
| EP | 08929798 A2 | 3/1998 |
| EP | 1297488 B1 | 4/2003 |
| EP | 1 450 243 A2 | 8/2004 |
| GB | 2204126 A | 11/1988 |
| JP | 57-211637 A | 12/1982 |
| JP | 8-108689 A | 4/1996 |
| JP | 8-240407 A | 9/1996 |
| JP | 9-91094 A | 4/1997 |
| JP | 9-224111 A | 8/1997 |
| JP | 9-319501 A | 12/1997 |
| JP | 10-105324 A | 4/1998 |
| JP | 2001-282456 A | 10/2001 |
| JP | 2003-167669 A | 6/2003 |
| JP | 2003-173237 A | 6/2003 |
| WO | 98/07112 A2 | 2/1998 |
| WO | 99/02112 A1 | 4/1999 |
| WO | 99/28812 A1 | 6/1999 |
| WO | 99/40562 A1 | 8/1999 |
| WO | 02/03316 A1 | 1/2002 |
| WO | 02/27461 A1 | 4/2002 |
| WO | 03/105074 A2 | 12/2003 |
| WO | 2005/106775 A1 | 11/2005 |
| WO | 2007/003196 A2 | 1/2007 |
| WO | 2007/064804 A1 | 6/2007 |

OTHER PUBLICATIONS

International Search Report with a mailing date of Oct. 22, 2001 for PCT/CA 01/00980 with an International Filing Date of Jul. 5, 2001.

Funk, Bud K., CCD's in optical panels deliver high resolution, Electronic Design, Sep. 27, 1980, pp. 139-143.

Partial European Search Report for EP 03 25 7166 which was completed on May 19, 2006.

European Search Report for EP 06 01 9269 for a search that was completed on Nov. 9, 2006.

European Search Report for EP 06 01 9268 for a search that was completed on Nov. 9, 2006.

European Search Report for EP 02 25 3594 for a search that was completed on Dec. 14, 2005.

European Search Report for EP 04 25 1392 for a search that was completed on Jan. 11, 2007.

Förstner, Wolfgang, "On Estimating Rotations", Festschrift für Prof. Dr.-Ing. Heinrich Ebner zum 60. Geburtstag, Herausg.: C. Heipke und H. Mayer, Lehrstuhl für Photogrammetrie und Fernerkundung, TU München, 1999, 12 pages. (http://www.ipb.uni-bonn.de/papers/#1999).

Hartley, R. and Zisserman, A., "Multiple View Geometry in Computer Vision", Cambridge University Press, First published 2000, Reprinted (with corrections) 2001, pp. 70-73, 92-93 and 98-99.

Kanatani, K., "Camera Calibration", Geometric Computation for Machine Vision, Oxford Engineering Science Series, vol. 37, 1993, pp. 56-63.

Wrobel, B., "Minimum Solutions for Orientation", Calibration and Orientation of Cameras in Computer Vision, Springer Series in Infomation Sciences, vol. 34, 2001, pp. 28-33.

Wang, F., et al., "Stereo camera calibration without absolute world coordinate information", SPIE, vol. 2620, pp. 655-662, Jun. 14, 1995.

International Search Report for PCT/CA2008/001350 mailed Oct. 17, 2008 (5 Pages).

International Search Report and Written Opinion for PCT/CA2004/001759 mailed Feb. 21, 2005 (7 Pages).

European Search Opinion for EP 07 25 0888 dated Jun. 22, 2007 (2 Pages).

European Search Report for EP 07 25 0888 dated Jun. 22, 2007 (2 pages).

Tapper, C.C., et al., "On-Line Handwriting Recognition—A Survey", Proceedings of the International Conference on Pattern Recognition (ICPR), Rome, Nov. 14-17, 1988, Washington, IEEE Comp. Soc. Press. US, vol. 2 Conf. 9, Nov. 14, 1988, pp. 1123-1132.

* cited by examiner

GESTURE RECOGNITION METHOD AND TOUCH SYSTEM INCORPORATING THE SAME

This is a continuation of U.S. patent application Ser. No. 10/662,813, filed Sep. 16, 2003, now U.S. Pat. No. 7,411,575, issued Aug. 12, 2008, the contents of both of which are incorporated herein by reference.

FIELD OF THE INVENTION

The present invention relates generally to touch systems and in particular to a gesture recognition method and touch system incorporating the same.

BACKGROUND OF THE INVENTION

Touch systems are well known in the art and typically include a touch screen having a touch surface on which contacts are made using a pointer in order to generate user input. Pointer contacts with the touch surface are detected and are used to generate corresponding output depending on areas of the contact surface where the contacts are made. There are basically two general types of touch systems available and they can be broadly classified as "active" touch systems and "passive" touch systems.

Active touch systems allow a user to generate user input by contacting the touch surface with a special pointer that usually requires some form of on-board power source, typically batteries. The special pointer emits signals such as infrared light, visible light, ultrasonic frequencies, electromagnetic frequencies, etc. that activate the touch surface.

Passive touch systems allow a user to generate user input by contacting the touch surface with a passive pointer and do not require the use of a special pointer in order to activate the touch surface. The pointer can be a finger, a cylinder of some material, or any suitable object that can be used to contact some predetermined area of interest on the touch surface.

Passive touch systems provide advantages over active touch systems in that any suitable pointing device, including a user's finger, can be used as a pointer to contact the touch surface. As a result, user input can easily be generated. Also, since special active pointers are not necessary in passive touch systems, battery power levels and/or pointer damage, theft, or misplacement are of no concern to users.

For example, U.S. patent application Ser. No. 09/610,481 filed on Jul. 5, 2000 and International PCT Application No. PCT/CA01/00980 filed on Jul. 5, 2001 and published under No. WO 02/03316 on Jan. 10, 2002, assigned to SMART Technologies Inc., assignee of the present invention, disclose a camera-based touch system comprising a touch screen that includes a passive touch surface on which a computer-generated image is presented. A rectangular bezel or frame surrounds the touch surface and supports digital cameras at its corners. The digital cameras have overlapping fields of view that encompass and look across the touch surface. The digital cameras acquire images looking across the touch surface from different locations and generate image data. Image data acquired by the digital cameras is processed by digital signal processors associated with the digital cameras to determine if a pointer exists in the captured image data. When it is determined that a pointer exists in the captured image data, the digital signal processors generate pointer information packets (PIPs) and convey the PIPs to a master controller. Each PIP includes a header portion, a data portion and a checksum. The data portion includes a pointer ID field that stores a pointer identifier to allow multiple pointers to be tracked. The data portion also includes a pointer location parameter that identifies a pointer x-position and a pointer tip parameter that identifies a pointer z-position. A contact state field stores a value indicating whether the pointer is in or out of contact with the touch surface allowing pointer hover to be detected.

Upon receipt of the PIPs, the master controller processes the PIPs using triangulation to determine the location of each pointer in the captured images relative to the touch surface in (x,y) coordinates. In this manner, as PIPs are generated in response to captured images, the position and movement of pointers over the touch surface can be tracked. The pointer location data generated by the master controller is conveyed to a computer executing one or more application programs. The computer uses the pointer location data to update the computer-generated image that is presented on the touch surface. Pointer contacts on and pointer movement over the touch surface can therefore be recorded as writing or drawing or used to control execution of application programs executed by the computer.

As will be appreciated, since digital cameras at the corners of the bezels are used to capture image data, the touch system is able to determine when multiple pointers contact and move across the touch surface. This of course provides for enhanced functionality as compared to analog resistive touch systems that are only able to track a single pointer. Although enhanced functionality is provided by the above-described camera-based touch system, to-date, this enhanced functionally has not been fully exploited. It is therefore an object of the present invention to provide a novel gesture recognition method and touch system incorporating the same.

SUMMARY OF THE INVENTION

According to one aspect of the present invention there is provided a gesture recognition method comprising the steps of:

displaying an image on a touch surface;

detecting pointer contacts on said touch surface and examining said pointer contacts to recognize multiple pointer contacts representing a gesture; and when multiple pointer contacts representing a gesture occur, updating the displayed image in accordance with said gesture.

Multiple pointer contacts representing a gesture include multiple finger contacts on the touch surface, a finger contact on the touch surface and an object contact on the touch surface and multiple object contacts on the touch surface.

In one aspect, the gesture is a right-click event and is represented by a first pointer contact on a displayed application, and a subsequent second pointer contact that occurs within a threshold distance of the first pointer contact and while the first pointer contact is maintained. In another aspect, the gesture is a scroll event and is represented by simultaneous pointer contacts on the touch surface.

According to another aspect of the present invention there is provided a gesture recognition method comprising the steps of:

detecting multiple pointers in close proximity to a touch surface to determine if said multiple pointers are being used to perform a known gesture; and when said multiple pointers are being used to perform a known gesture, executing a command associated with said gesture.

Preferably, during the detecting, pointer contacts with or close pointer hovers over the touch surface are detected to determine if a known gesture is being performed and specifically if one of a number of known gestures is being performed, each known gesture being associated with a different command. In a preferred embodiment, the movement of the multiple pointers relative to the touch surface and/or the pointer type determines the gesture being performed.

According to yet another aspect of the present invention there is provided an input detection method in an interactive system capable of detecting movement of multiple pointers generally simultaneously within an input region, said method comprising the steps of:

capturing images looking generally across said input region;

analyzing said images to detect multiple pointers within said input region;

when multiple pointers are detected, examining data associated with said multiple pointers to determine if the data represents an input gesture; and when the data represents an input gesture, executing a command corresponding to the recognized input gesture.

According to still yet another aspect of the present invention there is provided a touch system comprising:

a touch surface to be contacted by at least one pointer;

at least one imaging device having a field of view looking generally across said touch surface; and at least one processor communicating with said at least one imaging device and analyzing images acquired by said at least one imaging device to determine the location on said touch surface where pointer contacts are made, when said touch surface is contacted by multiple pointers, said processor examining said multiple pointer contacts to determine if said multiple pointer contacts represent a gesture and when said multiple pointer contacts represent a gesture, said processor executing a command associated with said gesture.

According to still yet another aspect of the present invention there is provided an interactive input system comprising:

at least one imaging device having an input region within its field of view into which one or more pointers is moved to generate user input; and at least one processor communicating with said at least one imaging device and analyzing each image acquired by said at least one imaging device to determine the action of pointers in said input region, said at least one processor determining when multiple pointer actions within said input region represent a gesture, when said multiple pointer actions represent a gesture, said at least one processor executing a command corresponding to said gesture.

According to still yet another aspect of the present invention there is provided in an interactive touch system, a method of simulating a right-click mouse event comprising the steps of:

detecting a first pointer contact on a touch surface over a displayed application that represents a left-click mouse event;

detecting a second pointer contact on said touch surface that occurs within a threshold period of time following said first pointer contact and within a threshold distance of said first pointer contact; and generating a right-click mouse event in response to said detected second pointer contact.

The present invention provides advantages in that since gestures represented by multiple pointer contacts on and/or movement over the touch surface are detected and corresponding commands generated, enhanced touch system functionality is provided.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

Figure 1:
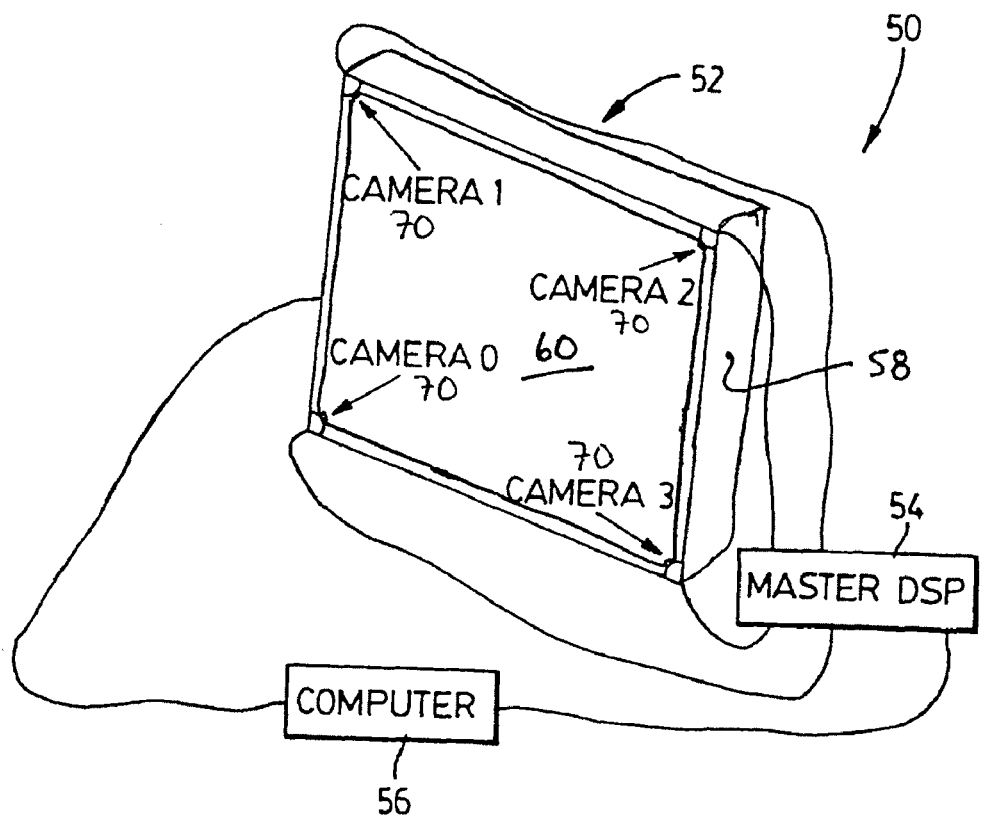
FIG. 1 is a schematic diagram of a camera-based touch system in accordance with the present invention.

Turning now to FIG. 1, a camera-based touch system in accordance with the present invention is shown and is generally identified by reference numeral 50. Camera-based touch system 50 is similar to that disclosed in International PCT Application Serial No. WO 02/03316, assigned to SMART Technologies Inc., assignee of the present invention, the contents of which are incorporated herein by reference. As can be seen, touch system 50 includes a touch screen 52 coupled to a digital signal processor (DSP) based master controller 54. Master controller 54 is also coupled to a computer 56. Computer 56 executes one or more application programs and provides computer-generated image output that is displayed on the touch screen 52. The coordinate system of the touch system 52 is mapped to the coordinate system of the computer. The touch screen 52, master controller 54 and computer 56 form a closed-loop so that pointer hover or contacts with and pointer movement over or above the touch screen 52 can be recorded as writing or drawing or used to control execution of application programs executed by the computer 56.

Figure 2:
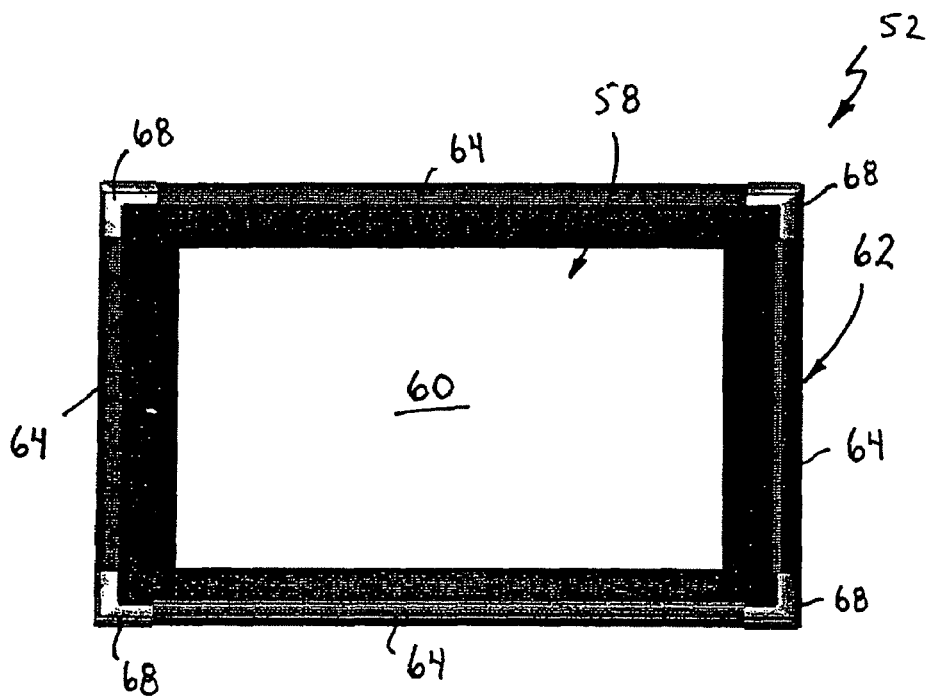
FIG. 2 is a front elevation view of a touch screen forming part of the touch system of FIG. 1.
Figure 3A:
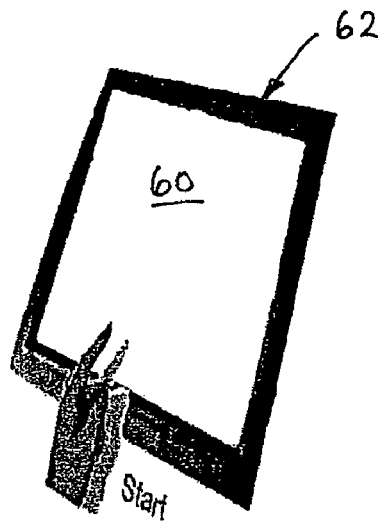
FIGS. 3a to 3d are front perspective views of the touch screen of FIG. 2 showing an input right-click gesture.
Figure 3B:
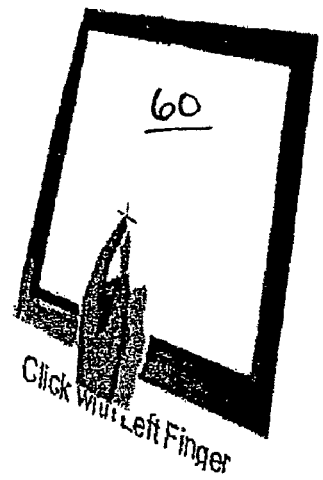
Figure 3C:
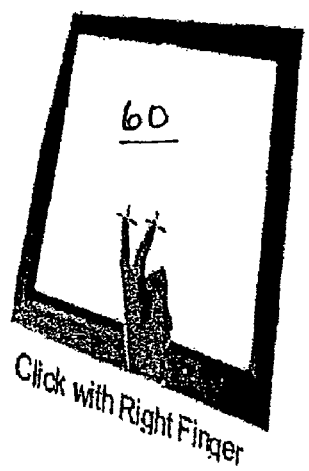
Figure 3D:
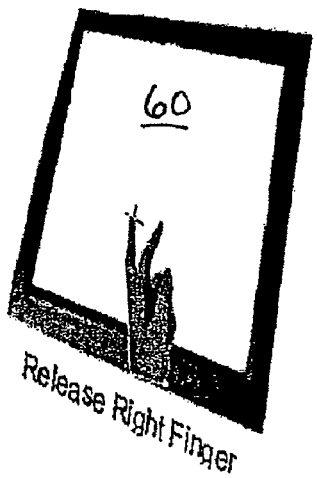
Figure 4A:
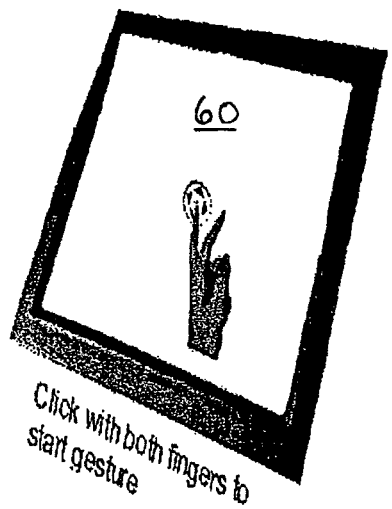
FIGS. 4a to 4f are front perspective views of the touch screen of FIG. 2 showing input up/down and left/right scroll gestures.
Figure 4B:
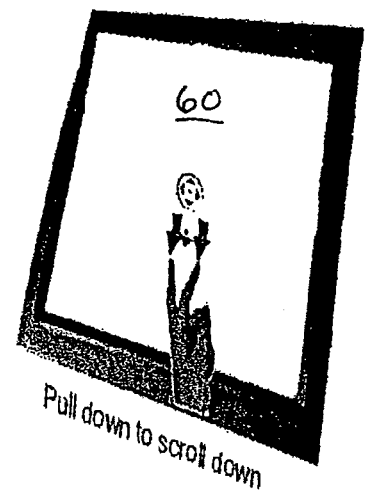
Figure 4C:
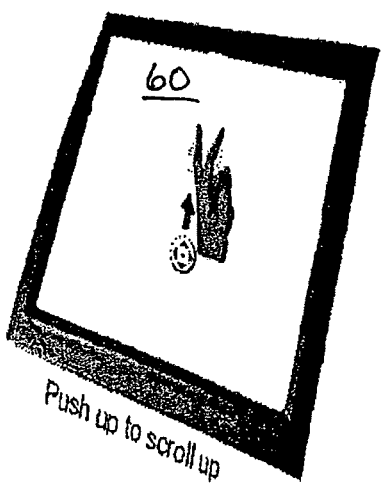
Figure 4D:
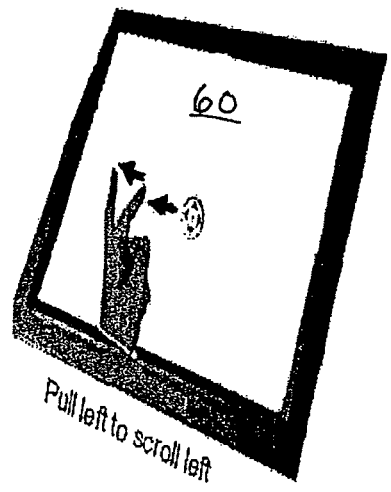
Figure 4E:
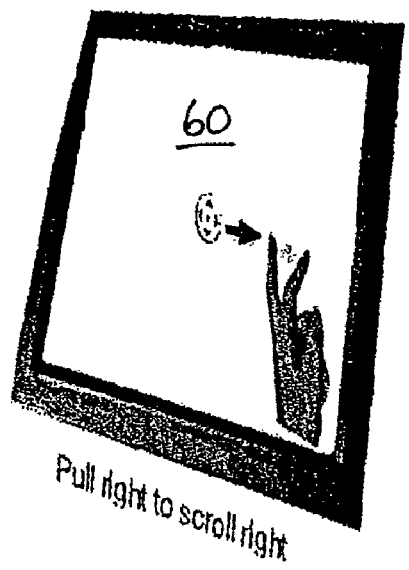
Figure 4F:
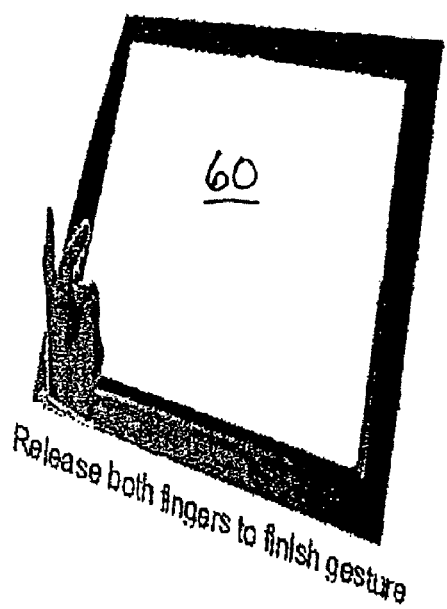

FIG. 2 better illustrates the touch screen 52. Touch screen 52 in the present embodiment includes a high-resolution display device such as a plasma display 58, the front surface of which defines a touch surface 60. The touch surface 60 is bordered by an illuminated bezel or frame 62 coupled to the display device. Illuminated bezel 62 is of the type disclosed in U.S. patent application Ser. No. 10/354,168 filed on Jan. 30, 2003 and includes elongate side frame assemblies 64 that are coupled to the sides of the plasma display 58. Each side frame assembly 64 accommodates a light source (not shown) that projects infrared backlighting across the touch surface 60. The ends of the side frame assemblies 64 are joined by corner pieces 68 that house DSP-based CMOS digital cameras 70. Each digital camera 70 is mounted within its respective corner piece 68 so that its field of view encompasses and looks across the entire touch surface 60.

During operation, the digital cameras 70 acquire images of the touch surface 60 and generate image data. The acquired image data is processed by digital signal processors associated with the digital cameras 70 to determine if a pointer exists in the captured images. When it is determined that one or more pointers exist in the acquired image data, the digital signal processors of the digital cameras 70 generate pointer information packets (PIPs) and convey the PIPs to the digital signal processor (DSP) based master controller 54. Each PIP includes a header portion, a data portion and a checksum. The data portion includes a pointer ID field that stores a pointer identifier to allow multiple pointers to be tracked. The data portion also includes a pointer location parameter that identifies a pointer x-position and a pointer tip parameter that identifies a pointer z-position. A contact state field stores a value indicating whether the pointer is in or out of contact with the touch surface 60 allowing pointer hover to be detected.

Upon receipt of the PIPs, the master controller 54 processes the PIPs using triangulation to determine the location of each pointer in the captured images relative to the touch surface 60 in (x,y) coordinates. In this manner, as PIPs are generated in response to captured images, the position and movement of pointers over the touch surface 60 can be tracked. Since image data is processed to detect the existence of one or more pointers, the pointers may take any suitable form such as for example, a user's finger, a cylinder of material, a passive or active pen tool or erase tool or other appropriate object. Specifics of the manner by which the image data is acquired by the digital cameras 70 and processed by the master controller 54 are described in International PCT Application No. PCT/CA01/00980 filed on Jul. 5, 2001 and published under No. WO 02/03316 on Jan. 10, 2002, the contents of which are incorporated herein by reference. Accordingly, such specifics will not be described further herein.

The master controller 54 outputs generated pointer data to the computer 56 that identifies the location of each pointer relative to the touch surface as each pointer approaches and/or contacts and moves over the touch surface 60. A driver loaded on the computer 56 receives the pointer data and examines the pointer data to determine if the pointer data has been generated in response to a known input gesture stored in a gesture library. Specifically, the driver examines the pointer data to detect the existence of multiple pointers in captured images and then examines the nature of the multiple pointers to determine if a known gesture has been performed such as for example a right-click gesture, a scroll gesture, a rotate gesture etc. When a gesture has been performed, the driver generates a command (event) that is associated with the determined gesture and conveys the command to the active application program being executed by the computer 56.

Turning now to FIGS. 3a to 4f, examples of gestures that can be recognized by the touch system and the resulting actions that are performed in response to the recognized gestures are shown.

Intuitive Right-Click Gesture

FIGS. 3a to 3d illustrate an intuitive right-click gesture. When a user contacts the touch surface 60 with a finger over an application displayed on the touch surface, the driver recognizes the contact as a left-click mouse event and injects the left-click mouse event into the application. If the user subsequently contacts the touch surface 60 with another finger while maintaining the contact with the one finger and the subsequent contact is to the right of and close to the initial contact, the driver recognizes the second touch surface contact as a right-click gesture and injects a right-click event into the application. In response to the right-click event, the application opens and displays a drop down menu (not shown). As will be appreciated, this enables a user to invoke a right-click action using a hand gesture that is similar to the action performed when invoking a right-click action using a mouse. Although, FIGS. 3a to 3d show the intuitive right-click gesture being performed using two fingers on the same hand, it will be appreciated that the right-click gesture can be performed using a finger on different hands.

Scroll UP/Down and Left/Right Gesture

FIGS. 4a to 4e illustrate up/down and left/right scroll gestures. If the user contacts the touch surface 60 with a pair of fingers simultaneously over an application window displayed on the touch surface and the fingers are closely and generally horizontally spaced, the driver recognizes the simultaneous finger contacts as a scroll gesture and injects a scroll event into the application. Pointer position data conveyed to the application by the driver in response to subsequent vertical movement of the fingers is interpreted by the application either as scroll up or scroll down commands. In response to the scroll up or down commands, the application moves information presented within the application window in the direction of the vertical movement. Pointer position data conveyed to the application by the driver in response to subsequent horizontal movement of the fingers is interpreted by the application as scroll to side commands. In response to the scroll to side commands, the application moves information displayed within the application window to the side corresponding to the direction of the horizontal movement. Although FIGS. 4a to 4f show the scroll gestures being performed using two fingers on the same hand, it will be appreciated that the scroll gestures can be performed using a finger on different hands.

Although not illustrated, a number of other gestures can be recognized by the driver and used to generate commands to control an application being executed by the computer 56. Examples of such other gestures will now be described.

Page Up/Down Gesture

If the user contacts the touch surface 60 with three fingers simultaneously over an application window displayed on the touch surface and the three fingers are closely and generally horizontally spaced, the driver recognizes the simultaneous finger contacts as a page gesture and injects a page event into the application. Pointer position data conveyed to the application by the driver in response to subsequent vertical movement of the fingers is interpreted by the application as page up or page down commands depending on the direction of the vertical movement. In response to the page up or page down commands, the application moves information displayed within the window in the appropriate direction.

Rotate Gesture

If the user contacts the touch surface 60 over an object displayed within an application window with one finger and then subsequently contacts the touch surface with another finger and moves that other finger in an arc while maintaining the touch surface contact with the one finger, the driver recognizes the arcuate movement of the second finger as a rotate gesture. The driver in turn injects a rotate command into the application causing the application to rotate the object about the contact point defined by the first finger in the direction of the arc and by an amount equivalent to the path of the arc.

Zoom Gesture

If the user contacts the touch surface 60 with a pair of closely spaced fingers simultaneously over an application window and expands the distance between the fingers in a generally horizontal direction, the driver recognizes the finger movement as a zoom-out gesture. The driver in turn injects a zoom-out command into the application causing the application to expand the size of the information presented in the application window. If the user contacts the touch surface 60 with a pair of spaced fingers simultaneously over an application window and moves the fingers in a generally horizontal direction towards one another, the driver recognizes the finger movement as a zoom-in gesture. The driver in turn injects a zoom-in command into the application causing the application to reduce the size of the information presented in the application window.

Alternatively, the zoom-out and zoom-in commands may be represented by other gestures. For example, if the user contacts the touch surface 60 with a clawed hand having its fingers bunched together over an application window and expands the hand by extending the fingers outwardly, the driver recognizes the finger movement as the zoom-out gesture.

If the user contacts the touch surface 60 with a generally flat hand having its fingers extended over an application window and contracts the hand by clawing the fingers inwardly to bunch them together, the driver recognizes the finger movement as the zoom-in gesture.

Expand Gesture

If the user contacts the touch surface 60 with a pair of closely spaced fingers simultaneously over an application window and expands the distance between the fingers in a generally diagonal direction, the driver recognizes the finger movement as an increase window size gesture. The driver in turn injects an increase window size command into the application causing the application to expand the size of the application window. If the user contacts the touch surface 60 with a pair of spaced fingers simultaneously over an application window and moves the fingers in a generally diagonal direction towards one another, the driver recognizes the finger movement as a decrease window size gesture. The driver in turn injects a decrease window size command into the application causing the application to reduce the size of the application window.

Icon Select and Open Gesture

If the user contacts the touch surface 60 with two closely spaced fingers simultaneously over an icon, the driver recognizes the finger contact as a double-click gesture. The driver in turn generates an open application command causing the desktop application running on the computer 56 to open the selected application.

Object/Window Move Gesture

If the user moves a pair of closely spaced fingers above the touch surface 60 and over an object displayed within an application window, the driver recognizes the hovering finger movement as a translate object gesture. The driver in turn injects a translate object command into the application causing the application to translate the displayed object in the direction of and by an amount equal to the distance the fingers are moved.

If the user moves three closely spaced fingers above the touch surface 60 and over an application window, the driver recognizes the hovering finger movement as a translate window gesture. The driver in turn generates a translate window command causing the desktop application running on the computer 56 to translate the application window in the direction of and by an amount equal to the distance the fingers are moved.

Although the above gestures are described as being recognized in response to multiple finger contacts or hovers, the same gestures can be recognized if other objects are used to perform the gestures. For example, multiple pen tools can be used to perform the gestures or alternatively a finger and a pen tool can be used to perform the gestures.

Also, recognized gestures may be enhanced using different pointer characteristics. For example, in the case of scroll gestures, the angle at which the pointers contact the touch surface 60 may be used to determine the rate at which the displayed information is scrolled. Pointers contacting the touch surface 60 at a steep angle may represent a slow scroll rate whereas pointers contacting the touch surface 60 at a shallow angle may represent a fast scroll rate.

If the touch system is able to differentiate between the type of pointers used to contact the touch surface 60 as is described in co-pending U.S. patent application Ser. No. 10/384,783 filed on Mar. 11, 2003 and/or is able to determine pointer characteristics as is described in co-pending U.S. patent application Ser. No. 10/294,917, filed on Nov. 15, 2002, the contents of which are incorporated herein by reference, different functionality can be assigned to similar gestures that are performed using different pointers. For example, in the case of the rotate gesture described above, if the same gesture is carried out using a finger to initially contact an object within the application window and a pen tool to describe the arc, the driver recognizes the finger contact and pen movement as a pattern fill gesture rather than a rotate gesture. A finger contact and subsequent closely spaced pen tool contact may represent a draw circle gesture rather than a scroll gesture and a finger contact and subsequent closely spaced eraser contact may represent an erase page gesture. As will be appreciated, being able to differentiate between multiple pointers brought into proximity with the touch surface 60 significantly increases the functions that may be invoked by performing the same gestures simply by using discrete pointers that can be differentiated.

Although the driver is described as examining the pointer data to determine if the pointer data is generated in response to a known gesture, it will be appreciated by those of skill in the art that if the active application being executed by the computer has the capability of recognizing gestures, the pointer data may be conveyed to the active application for gesture recognition.

If desired the touch surface 60 may be partitioned into multiple regions to enable multiple users to interact with the touch surface simultaneously without ambiguity between user input. In this case multiple contacts on or hovers over the touch surface that are beyond a threshold distance are treated as multiple user inputs. Multiple contacts on or hovers over the touch surface that are within the threshold distance are treated as multiple contacts made by a single user and are examined to determine if the multiple contacts represent a gesture.

Although preferred embodiments of the present invention have been described, those of skill in the art will appreciate that variations and modifications may be made without departing from the spirit and scope thereof as defined by the appended claims.

What is claimed is:

1. An event generation method comprising the steps of:
   capturing images of a touch surface from different vantages using imaging devices that are proximate to the touch surface and aimed to look generally across said touch surface;
   processing the captured images to detect successive pointer contacts on said touch surface and to recognize a gesture based on the relative positions of the successive pointer contacts and the subsequent relative movement of the pointers along the touch surface; and
   generating an event when a gesture is recognized.

2. The method of claim 1 wherein during said processing, the images are processed to detect movement of multiple pointers towards one another.

3. The method of claim 1 wherein during said processing, the images are processed to detect movement of multiple pointers away from one another.

4. The method of claim 1 wherein during said processing, the images are processed to detect movement of one pointer in a generally arcuate path about another pointer.

5. The method of claim 1 wherein said event represents a graphical object manipulation command.

6. The method of claim 5 wherein said graphical object manipulation command is one of a graphical object resize command, a graphical object rotate and a graphical object translate command.

7. The method of claim 6 further comprising executing said graphical object manipulation command.

8. The method of claim 7 wherein during said processing, the images are processed to detect movement of multiple pointers towards one another.

9. The method of claim 8 wherein during said processing, the images are processed to detect movement of multiple pointers away from one another.

10. The method of claim 8 wherein during said processing, the images are processed to detect movement of one pointer in a generally arcuate path about another pointer.

11. An event generation method comprising the steps of:
detecting successive pointers brought into contact with and oriented generally normal to a touch surface and examining the relative positions of the pointer contacts and the subsequent relative movement of said pointers along said touch surface by processing images of the touch surface captured using imaging devices that are proximate to the touch surface and aimed to look generally across the touch surface to determine if a gesture has been input; and
generating an event when an input gesture is determined.

12. The method of claim 11 wherein during said examining, the subsequent relative movement of said pointers is examined to determine if said pointers are moving towards one another.

13. The method of claim 11 wherein during said examining, the subsequent relative movement of said pointers is examined to determine if said pointers are moving away from one another.

14. The method of claim 11 wherein during said examining, the subsequent relative movement of said pointers is examined to determine if one pointer is moving in a generally arcuate path about another pointer.

15. The method of claim 11 wherein during said examining, the subsequent relative movement of said pointers is examined to determine if said pointers are moving in a generally similar direction.

16. The method of claim 11 wherein said event represents a graphical object manipulation command.

17. The method of claim 16 wherein said graphical object manipulation command is one of a graphical object resize command, a graphical object rotate and a graphical object translate command.

18. The method of claim 17 further comprising executing said graphical object manipulation command.

19. The method of claim 18 wherein during said examining, the subsequent relative movement of said pointers is examined to determine if said pointers are moving towards one another.

20. The method of claim 18 wherein during said examining, the subsequent relative movement of said pointers is examined to determine if said pointers are moving away from one another.

21. The method of claim 18 wherein during said examining, the subsequent relative movement of said pointers is examined to determine if one pointer is moving in a generally arcuate path about another pointer.

22. The method of claim 18 wherein during said examining, the subsequent relative movement of said pointers is examined to determine if said pointers are moving in a generally similar direction.

23. An event generation method comprising the steps of:
capturing images of a touch surface from different vantages using imaging devices that are proximate to the touch surface and aimed to look generally across said touch surface;
processing the captured images to detect successive pointers brought into contact with said touch surface and to recognize a gesture based on the pointer contact positions and the subsequent relative movement of the pointers along said touch surface; and
generating an event when a gesture is recognized.

24. The method of claim 23 wherein during said processing, the images are processed to detect movement of multiple pointers towards one another.

25. The method of claim 23 wherein during said processing, the images are processed to detect movement of multiple pointers away from one another.

26. The method of claim 23 wherein during said processing, the images are processed to detect movement of one pointer in a generally arcuate path about another pointer.

27. The method of claim 23 wherein said event represents a graphical object manipulation command.

28. The method of claim 27 wherein said graphical object manipulation command is one of a graphical object resize command, a graphical object rotate and a graphical object translate command.

29. The method of claim 28 further comprising executing said graphical object manipulation command.

30. The method of claim 29 wherein during said processing, the images are processed to detect movement of multiple pointers towards one another.

31. The method of claim 29 wherein during said processing, the images are processed to detect movement of multiple pointers away from one another.

32. The method of claim 31 wherein during said processing, the images are processed to detect movement of one pointer in a generally arcuate path about another pointer.

33. An event generation method comprising the steps of:
detecting multiple pointers brought successively into contact with and oriented substantially normal to a touch surface and examining the relative positions of the pointer contacts and the subsequent relative movement of said pointers along said touch surface by processing images of the touch surface captured using imaging devices that are proximate to the touch surface and aimed to look generally across the touch surface to determine if a gesture has been input; and
generating an event when an input gesture is determined.

34. The method of claim 33 wherein during said examining, the subsequent relative movement of said pointers is examined to determine if said pointers are moving towards one another.

35. The method of claim 33 wherein during said examining, the subsequent relative movement of said pointers is examined to determine if said pointers are moving away from one another.

36. The method of claim 33 wherein during said examining, the subsequent relative movement of said pointers is examined to determine if one pointer is moving in a generally arcuate path about another pointer.

37. The method of claim 33 wherein during said examining, the subsequent relative movement of said pointers is examined to determine if said pointers are moving in a generally similar direction.

38. The method of claim 33 wherein said event represents a graphical object manipulation command.

39. The method of claim 38 wherein said graphical object manipulation command is one of a graphical object resize command, a graphical object rotate and a graphical object translate command.

40. The method of claim 39 further comprising executing said graphical object manipulation command.

41. The method of claim 40 wherein during said examining, the subsequent relative movement of said pointers is examined to determine if said pointers are moving towards one another.

42. The method of claim 40 wherein during said examining, the subsequent relative movement of said pointers is examined to determine if said pointers are moving away from one another.

43. The method of claim 40 wherein during said examining, the subsequent relative movement of said pointers is examined to determine if one pointer is moving in a generally arcuate path about another pointer.

44. The method of claim 40 wherein during said examining, the subsequent relative movement of said pointers is examined to determine if said pointers are moving in a generally similar direction.

45. An event generation method comprising the steps of:
capturing images from different vantages using imaging devices that are proximate to and aimed to look generally across a pointer input region;
processing the captured images to detect positions of multiple pointers brought successively into said pointer input regions and to recognize a gesture based on the detected pointer positions and the subsequent relative movement of the pointers within said pointer input region; and
generating an event when a gesture is recognized.

46. The method of claim 45 wherein during said processing, the images are processed to detect movement of multiple pointers towards one another.

47. The method of claim 45 wherein during said processing, the images are processed to detect movement of multiple pointers away from one another.

48. The method of claim 45 wherein during said processing, the images are processed to detect movement of one pointer in a generally arcuate path about another pointer.

49. The method of claim 45 wherein during said processing, the images are processed to detect movement of multiple pointers in a generally similar direction.

50. The method of claim 45 wherein said event represents a graphical object manipulation command.

51. The method of claim 50 wherein said graphical object manipulation command is one of a graphical object resize command, a graphical object rotate and a graphical object translate command.

52. The method of claim 51 further comprising executing said graphical object manipulation command.

53. The method of claim 52 wherein during said processing, the images are processed to detect movement of multiple pointers towards one another.

54. The method of claim 52 wherein during said processing, the images are processed to detect movement of multiple pointers away from one another.

55. The method of claim 52 wherein during said processing, the images are processed to detect movement of one pointer in a generally arcuate path about another pointer.

56. The method of claim 52 wherein during said processing, the images are processed to detect movement of multiple pointers in a generally similar direction.

* * * * *